US009862031B2

(12) United States Patent
Goodman et al.

(10) Patent No.: US 9,862,031 B2
(45) Date of Patent: Jan. 9, 2018

(54) TUBE SCRAPER WITH BIASED BLADES

(71) Applicant: Georg Fischer Central Plastics LLC, Shawnee, OK (US)

(72) Inventors: Robert A. Goodman, Shawnee, OK (US); Michael D. Smith, Shawnee, OK (US)

(73) Assignee: Georg Fischer Central Plastics LLC, Shawnee, OK (US)

( * ) Notice: Subject to any disclaimer, the term of this patent is extended or adjusted under 35 U.S.C. 154(b) by 216 days.

(21) Appl. No.: 14/680,642

(22) Filed: Apr. 7, 2015

(65) Prior Publication Data

US 2015/0321260 A1 Nov. 12, 2015

Related U.S. Application Data

(60) Provisional application No. 61/989,681, filed on May 7, 2014.

(51) Int. Cl.
*B23G 5/10* (2006.01)
*B23B 5/16* (2006.01)

(52) U.S. Cl.
CPC .............. *B23B 5/168* (2013.01); *B23B 5/167* (2013.01); *B23G 5/10* (2013.01); *B23B 5/16* (2013.01);
(Continued)

(58) Field of Classification Search
CPC ........... B23B 5/16; B23B 5/167; B23B 5/168; B23B 2215/72; B23B 51/103; B23G 5/10; Y10T 82/22
See application file for complete search history.

(56) References Cited

U.S. PATENT DOCUMENTS 399,707 A * 3/1889 Smith ............... B23B 29/03417
408/163
417,574 A * 12/1889 Mischke .................. B23G 5/12
279/108

(Continued)

FOREIGN PATENT DOCUMENTS

CH 256606 A * 8/1948 ............... B23G 5/10
GB 407896 A * 3/1934 ............... B23G 5/10

OTHER PUBLICATIONS

Catalog: Tools and Indexable Inserts for Turning and Threading, ARNO—Werkzeuge USA LLC, 2013, pp. 198-199, Harvard, Illinois, US.

*Primary Examiner* — Sunil K Singh
*Assistant Examiner* — Ryan Rufo
(74) *Attorney, Agent, or Firm* — Bachman & LaPointe, P.C.

(57) ABSTRACT

A tube scraping apparatus comprises a body having a passageway for receiving a piping component; and a first blade and a second blade. The first blade and second blade each: are mounted to the body and shiftable between a first condition and a second condition; and having an engagement portion positioned to engage an outer diameter (OD) surface of the received piping component in at least one condition, the first blade engagement portion comprising a cutting edge for removing material from the OD surface. The second blade engagement portion comprises a partial thread for engaging the piping component to convert a rotation of the piping component relative to the body to an axial movement of the piping component relative to the body.

16 Claims, 9 Drawing Sheets

(52) U.S. Cl.
CPC ....... *B23B 2215/72* (2013.01); *B23B 2226/61* (2013.01); *B23B 2260/096* (2013.01); *B23B 2260/136* (2013.01); *B23B 2260/138* (2013.01); *B23G 2225/40* (2013.01); *Y10T 82/10* (2015.01); *Y10T 82/22* (2015.01)

(56) References Cited

U.S. PATENT DOCUMENTS

| | | | | |
|---|---|---|---|---|
| 536,297 | A * | 3/1895 | Ressler | B23B 51/05 408/182 |
| 679,540 | A * | 7/1901 | Packer | B23G 9/004 470/86 |
| 813,114 | A * | 2/1906 | Pruess | B23B 49/04 408/200 |
| 1,045,885 | A * | 12/1912 | Ray | B23G 5/005 408/182 |
| 1,704,353 | A * | 3/1929 | Tolen | B23B 5/168 408/104 |
| 2,054,028 | A * | 9/1936 | Benninghoff | B23G 1/22 29/DIG. 68 |
| 4,289,430 | A * | 9/1981 | Shashaty | B23B 5/168 408/1 R |
| 5,600,862 | A | 2/1997 | Bleske et al. | |
| 6,434,776 | B1 | 8/2002 | Pfeiffer et al. | |
| 6,698,321 | B2 | 3/2004 | Oswald | |
| 2002/0129684 | A1 * | 9/2002 | Oswald | B23B 5/168 82/113 |
| 2005/0257388 | A1 * | 11/2005 | Snyder, Sr. | B23B 5/167 33/21.1 |
| 2007/0110531 | A1 * | 5/2007 | Hall | B23C 3/122 409/131 |
| 2011/0232434 | A1 | 9/2011 | Bortoli | |
| 2015/0047478 | A1 * | 2/2015 | DHooge | B23B 5/163 82/1.11 |

* cited by examiner

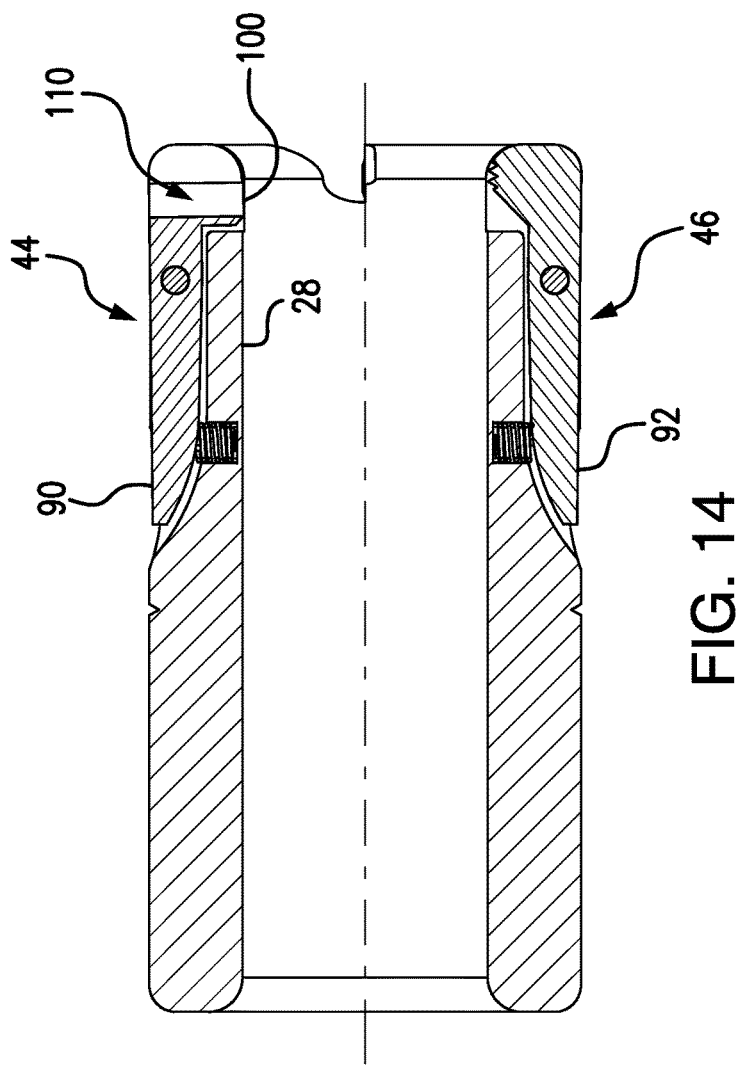
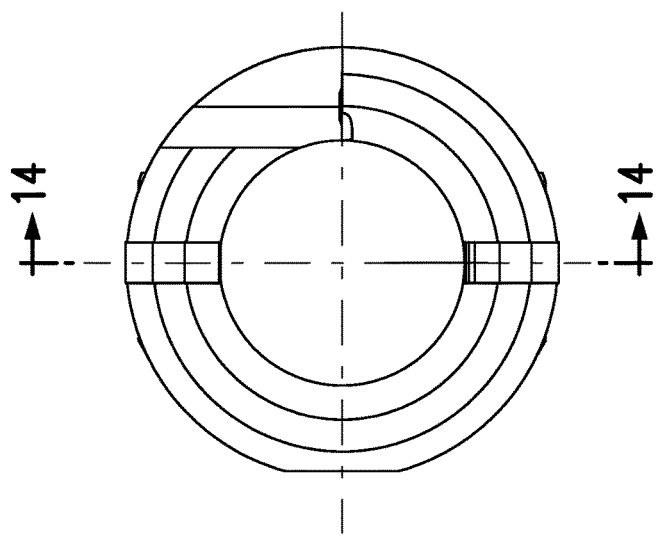
FIG. 14
FIG. 13

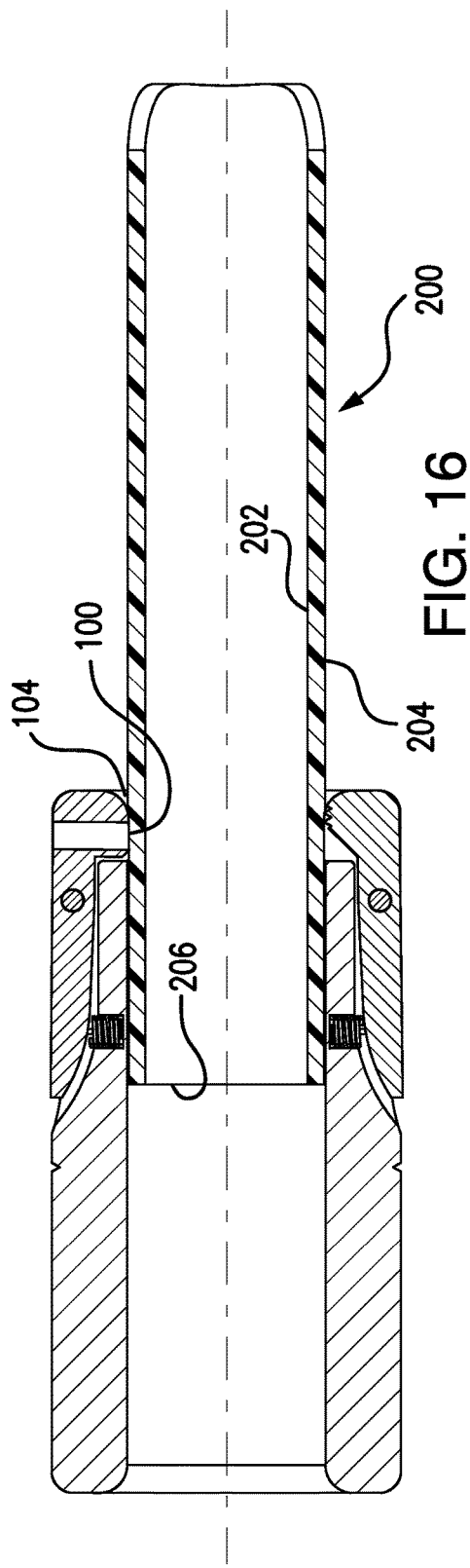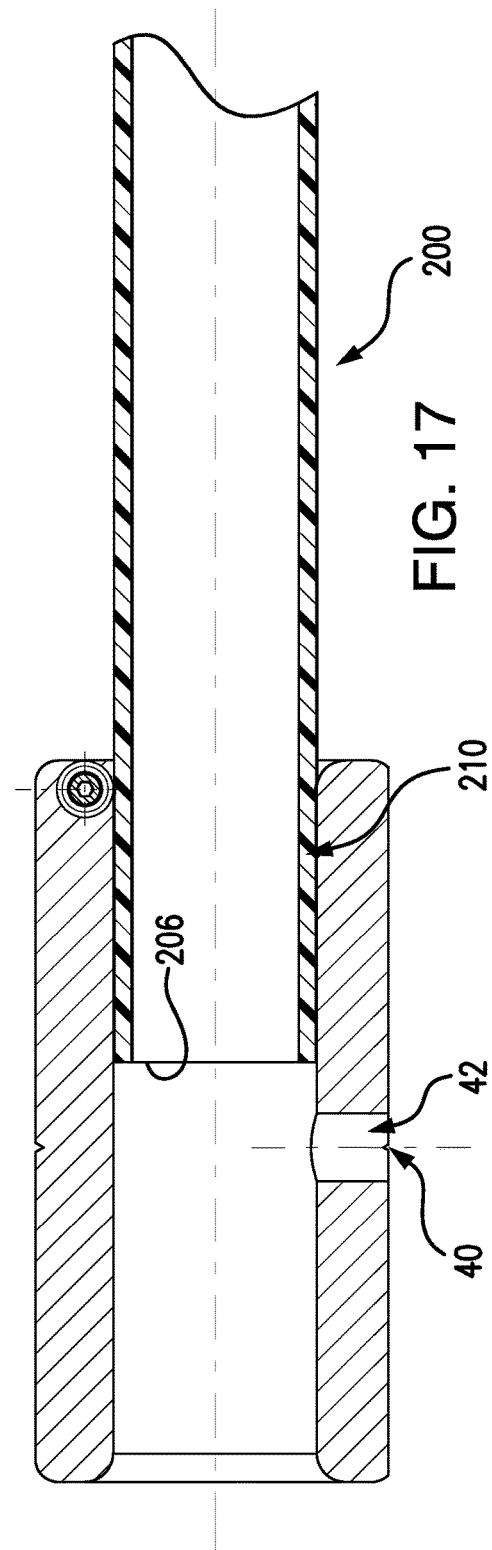

TUBE SCRAPER WITH BIASED BLADES

CROSS-REFERENCE TO RELATED APPLICATION

Benefit is claimed of U.S. Patent Application No. 61/989,681, filed May 7, 2014, and entitled "Tube Scraper with Biased Blades", the disclosure of which is incorporated by reference herein in its entirety as if set forth at length.

BACKGROUND OF THE INVENTION

The invention relates to plastic piping. More particularly, the invention relates to preparation of plastic pipe/tube material for electro-fusion bonding.

In order to connect thermoplastic piping systems together via electro-fusion methods it is standard practice to remove the outer oxidized surface of the pipe to expose clean un-contaminated plastic. Previous methods rely on fixed or pivoting cutting tools and/or internal drive mandrels to remove the outer oxidized layers.

An exemplary fixed diameter tool does not adequately scrape pipe that has an oval shape due to coiling.

An exemplary pivoting tool scraper relies on an internal drive mandrel to limit the forward helical cutting motion. On occasion it is necessary to connect two different thicknesses of pipe wall. This would require use of two different internal drive scrapers.

Examples of prior tools include those shown in U.S. Pat. Nos. 5,600,862, 6,434,776, and 6,698,321 and US patent application publication 2011232434A1. One additional previously proposed alternative features two spring-loaded scraping blades mounted in a generally tubular body.

SUMMARY OF THE INVENTION

One aspect of the disclosure involves a tube scraping apparatus comprising: a body having a passageway for receiving a piping component; and a first blade and a second blade. The first blade and second blade each: are mounted to the body and shiftable between a first condition and a second condition; and have an engagement portion positioned to engage an outer diameter (OD) surface of the received piping component in at least one condition. The first blade engagement portion comprises a cutting edge for removing material from the OD surface. The second blade engagement portion comprises means for engaging the piping component to convert a rotation of the piping component relative to the body to an axial movement of the piping component relative to the body.

A further embodiment may additionally and/or alternatively include at least one spring biasing the first blade and the second blade from the second condition toward the first condition.

A further embodiment may additionally and/or alternatively include the first blade being mounted for rotation about a first pivot axis between the associated first and second conditions and the second blade being mounted for rotation about a second pivot axis between the associated first and second conditions.

A further embodiment may additionally and/or alternatively include the first blade and the second blade each having a lever portion depressable to shift the respective first blade and second blade from the associated first condition to the associated second condition.

A further embodiment may additionally and/or alternatively include the first blade comprising an edge protruding radially inward from a portion of the first blade axially outboard thereof.

A further embodiment may additionally and/or alternatively include the means comprising a partial thread.

A further embodiment may additionally and/or alternatively include the partial thread comprising a plurality of thread segments.

A further embodiment may additionally and/or alternatively include a third blade positioned to cut material from a location on the piping component prior to said location encountering a cutting edge of the first blade.

A further embodiment may additionally and/or alternatively include the third blade being a fixed blade.

A further embodiment may additionally and/or alternatively include the third blade having a circular cutting edge.

A further embodiment may additionally and/or alternatively include a method comprising: inserting the piping component into the passageway; rotating the piping component in a first direction, the rotating causing the engagement of the second blade engagement portion with the OD surface to convert the rotation into further axial insertion of the piping component relative to the body; the rotation causing the first blade cutting edge to remove material from the OD surface; shifting the first blade and second blade toward the second condition against spring bias; and with the first blade and second blade shifted toward the second condition, extracting the piping component.

A further embodiment may additionally and/or alternatively include, with a third blade, cutting material from a location on the piping component prior to said location encountering the cutting edge of the first blade.

Another aspect of the disclosure involves a tube scraping apparatus comprising: a body having a passageway for receiving a piping component; and a first blade and a second blade. The first blade and second blade each: are mounted to the body and shiftable between a first condition and a second condition; and have an engagement portion positioned to engage an outer diameter (OD) surface of the received piping component in at least one condition. A fixed position third blade is positioned to cut material from the piping component.

A further embodiment may additionally and/or alternatively include the third blade being reorientatably mounted to allow a fresh cutting edge portion to be brought into an operative position.

Another aspect of the disclosure involves a method for processing a piping component. The method comprises: inserting a portion of the piping component into a tube scraping apparatus, the piping component having an inner diameter (ID) surface and an outer diameter (OD) surface; rotating the piping component relative to the tube scraping apparatus, the rotating and inserting causing a first blade to remove material from the OD surface. A second blade engages the piping component to convert the rotation of the piping component relative to the apparatus to an axial movement of the piping component relative to the apparatus.

A further embodiment may additionally and/or alternatively include the second blade having a plurality of thread segments for engaging the piping component OD surface to convert the rotation to the axial movement.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 13 is a front end view of the tube scraper with levers depressed.
FIG. 14 is a central longitudinal sectional view of the scraper taken along line 14-14 of FIG. 13.
FIG. 16 is a central longitudinal sectional view of the scraper taken along line 16-16 of FIG. 15.
FIG. 17 is a central longitudinal sectional view of the scraper taken along line 17-17 of FIG. 15.

Like reference numbers and designations in the various drawings indicate like elements.

DETAILED DESCRIPTION

Figure 1:
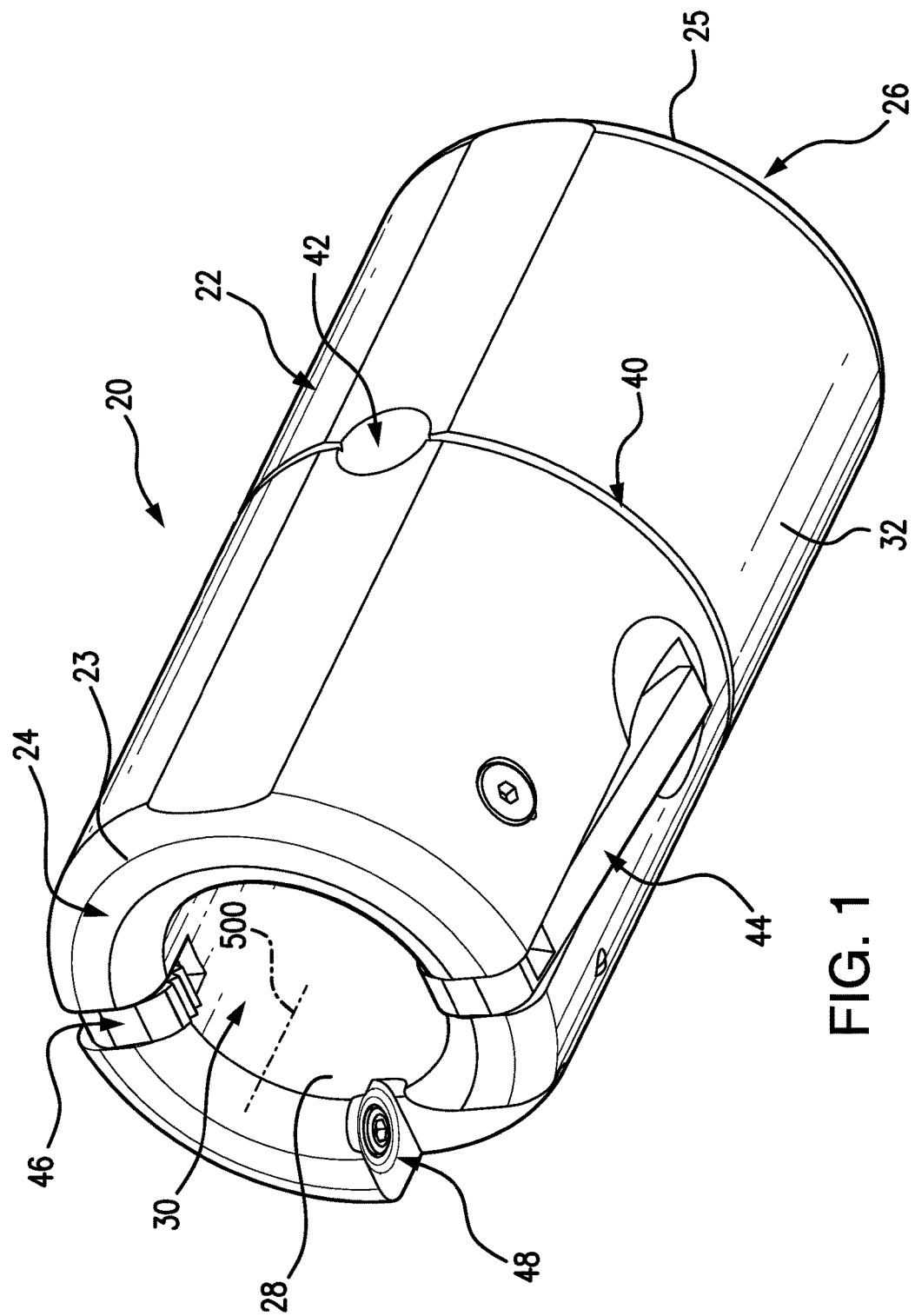
FIG. 1 is a view of a tube scraper.

FIG. 1 shows a tube scraper (scraper) 20. The scraper 20 comprises a body 22 extending from a first rim 23 at a first end 24 to a second rim 25 and a second end 26 and having an interior surface 28 along a central passageway 30 and an exterior surface 32. The exemplary passageway 30 is a full end-to-end passageway centered about a central longitudinal axis 500.

In operation, the tube scraper receives an end portion of the tube into the passageway 30 through the end 24. Unless explicitly indicated otherwise, the identified tube end portion may be an end portion of tubing or pipe stock or an end portion of a fitting or the like. The exterior surface 32 may bear an indicia 40 representative of the position of the end (rim) of the tube when fully inserted. Exemplary indicia 40 is a circumferential groove. The exemplary body also includes a window 42 between the interior and exterior surfaces 28 and 32 to allow viewing of the end in the fully inserted condition. For engaging the tube end portion, the scraper 20 further includes three blades 44, 46, and 48 mounted to the body.

Figure 2:
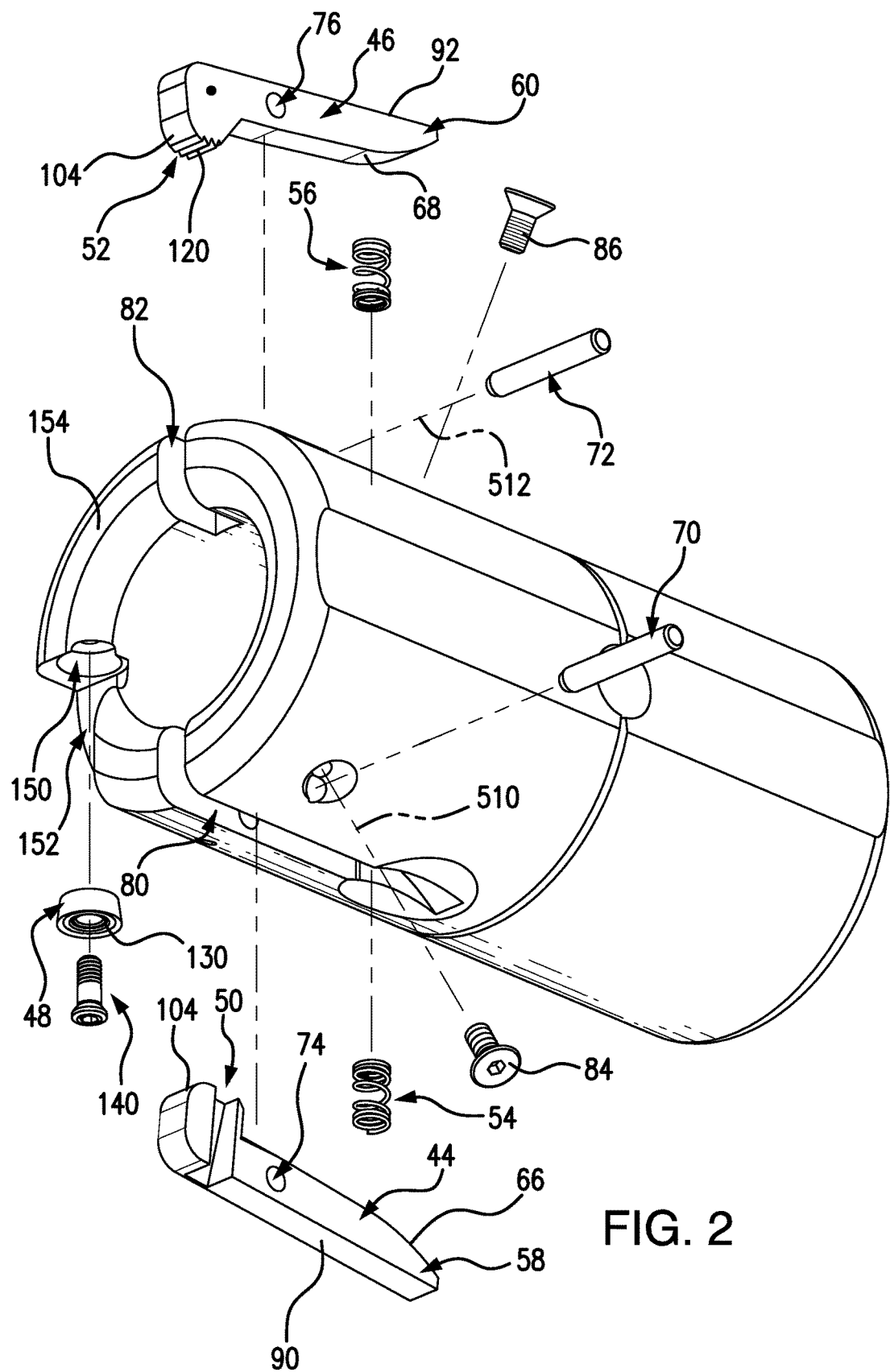
FIG. 2 is an exploded view of the scraper of FIG. 1.
Figure 3:
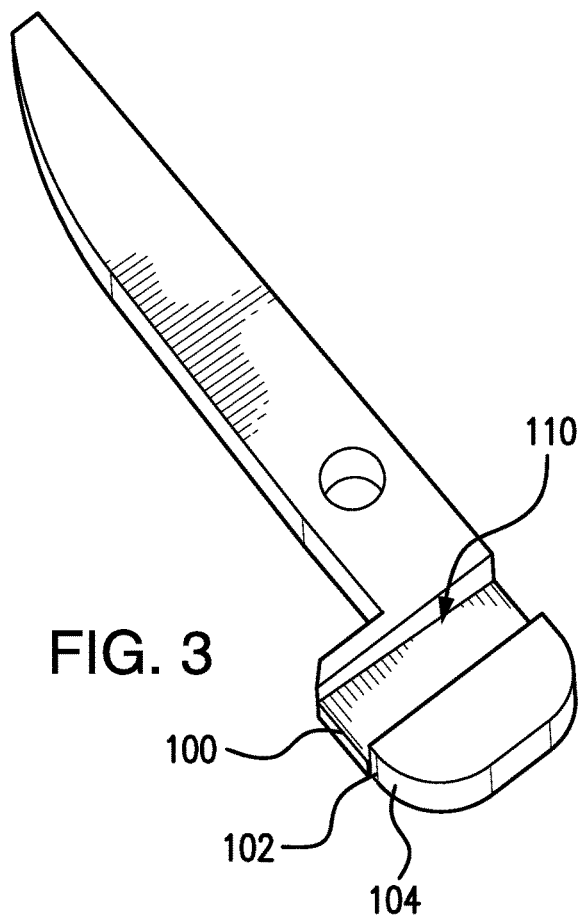
FIG. 3 is a first view of a scraping blade of the tube scraper.
Figure 4:
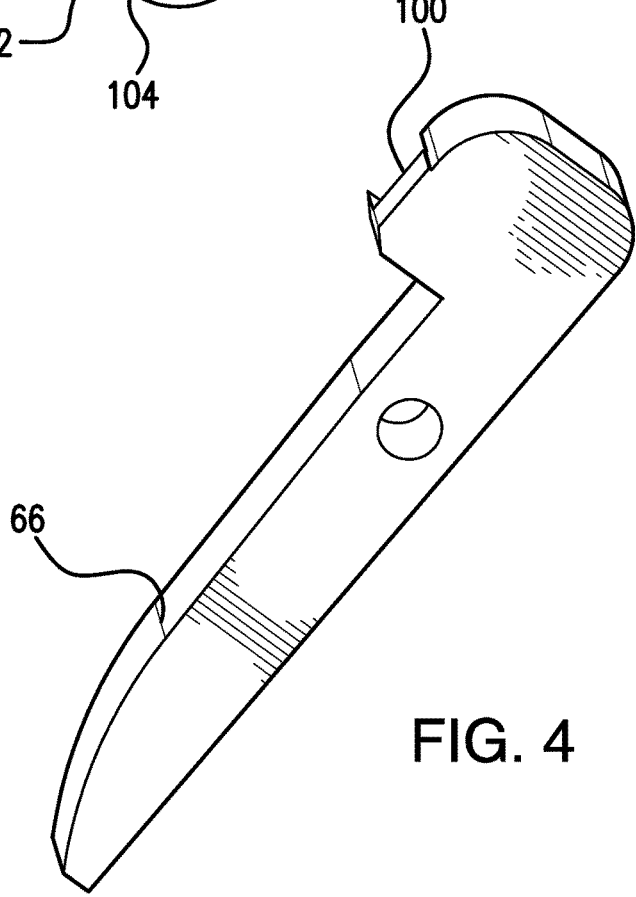
FIG. 4 is a second view of the scraping blade.
Figure 5:
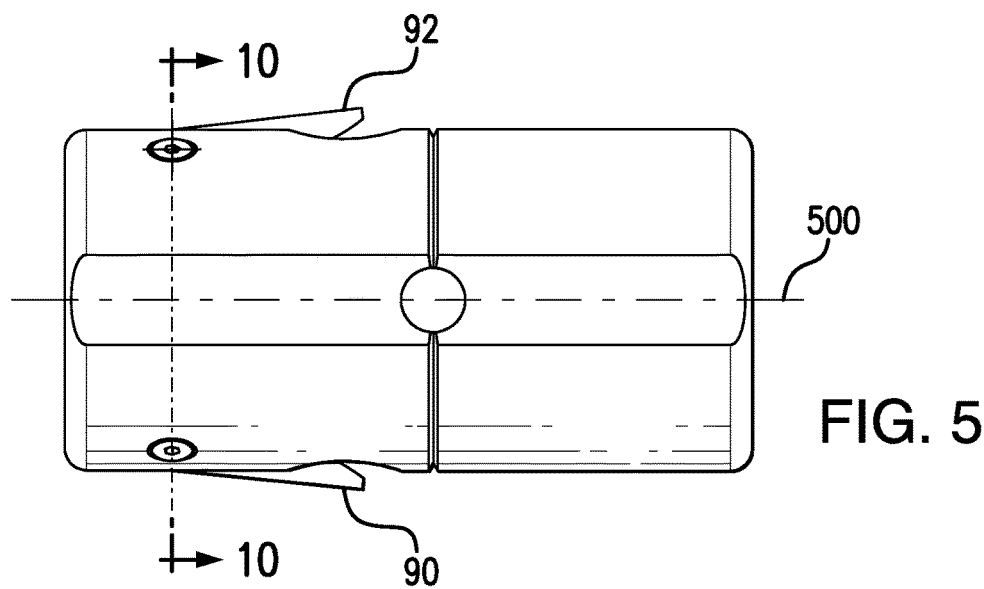
FIG. 5 is a top view of the tube scraper.
Figure 6:
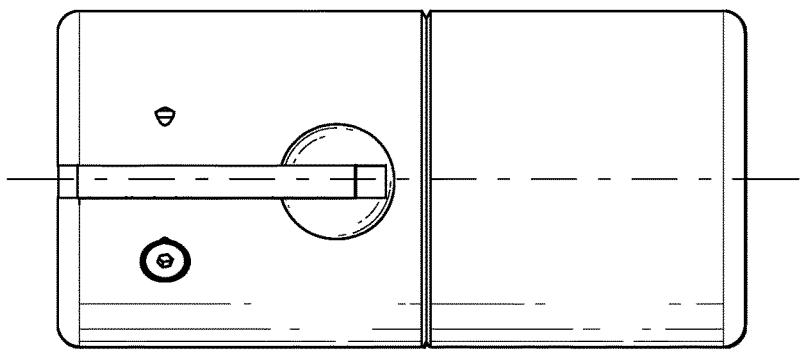
FIG. 6 is a right side view of the tube scraper.

The exemplary blades 44 and 46 are spring-biased and shiftable between first and second conditions noted below. FIG. 2 shows the blades 44 and 46 as having respective engagement portions 50 and 52 for engaging the outer diameter (OD) surface of the received tube end portion. The exemplary springs bias these two portions 50 and 52 into engagement/contact with the tube OD surface. FIGS. 1-12 show an extended/deployed condition at the terminal end of travel driven by the spring bias. A retracted condition has the portions 50 and 52 relatively removed/withdrawn from the tube OD surface. The exemplary movement between extended and retracted conditions is a pivoting movement about respective pivot axes 510 and 512 under bias of respective springs 54 and 56. The exemplary blades 44 and 46 are formed as levers with the portions 50 and 52 to one side of the associated pivot axis and lever portions (lever arm portions) 58 and 60 to the opposite side. The exemplary springs 54, 56 are coil compression springs mounted in associated blind compartments in the body (e.g., open radially outward) and engaging inboard surfaces 66, 68 of the respective lever portions to in turn bias the tube-engagement portions 50, 52 radially inward. Exemplary pivoting is provided by axles 70, 72 received in respective bores 74, 76 of the blades 44, 46 and associated bores within the body. The exemplary body comprises longitudinal slots 80, 82 receiving the blades with the pins 70, 72 spanning the associated slots. Lock screws 84, 86 may lock the pins in place. As is discussed further below, in operation, the user may manually engage outboard surfaces 90, 92 of the lever portions 58, 60 and press these surfaces inward to compress the springs and retract the tube engagement portions 50, 52 (FIGS. 13 and 14). This may allow easy withdrawal of the tube end portion after scraping.

As is discussed further below, the exemplary blades 44, 46 differ from each other in the nature of their engagement portions 50, 52. The engagement portion 50 is a scraper having an edge 100 (FIGS. 3 and 4) for engaging the tube OD surface to remove material as the pipe is rotated against the edge. The exemplary edge 100 protrudes slightly radially inward of a surface 102 of the blade thereahead so as to define a depth of cut. The exemplary blade has a passageway 110 formed as an open channel extending outboard from the edge along one face of the blade which allows passage of the cut material out of the scraper.

The function of the portion 52 is not material removal or thickness reduction but rather movement regulation. It comprises a partial thread in the form of a sequence of thread segments 120 (FIG. 2) at a given non-zero helix angle. The thread segments bite into the tube OD surface. As the tube is rotated, the helix angle converts the rotation into axial movement. The helix angle is selected in view of the size of the cutting edge to insure that a full rotation of the tube yields a translation equal to or less than the engagement length of the edge 100 so as to ensure full coverage of scraping. Each of the blades 44 and 46 comprises a convexly curved surface 104 leading into the edge 100 or thread segments 120. For the blade 44, this may be adjacent the surface 102 or the surface 102 may be a portion of the surface 104. This lead-in surface may help receive the pipe by contacting the rim and allowing the rim to cam the blade working portions radially outward (and thus the lever portions radially inward against spring bias) as the pipe is initially inserted.

Figure 7:
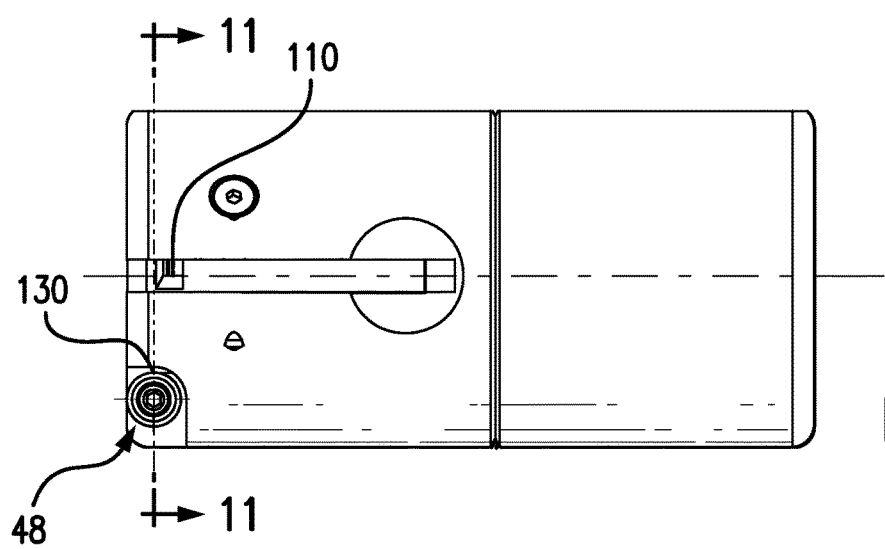
FIG. 7 is a left side view of the tube scraper.
Figure 8:
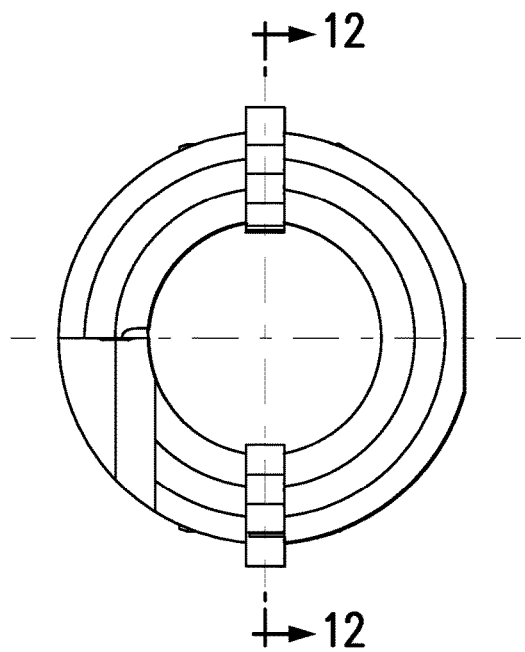
FIG. 8 is a front end view of the tube scraper.
Figure 9:
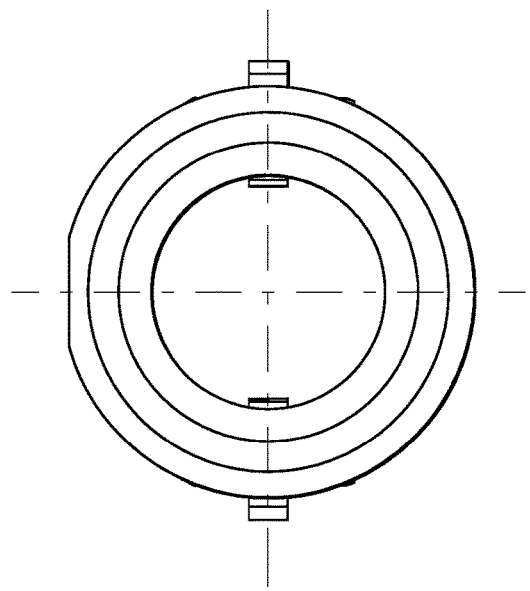
FIG. 9 is a rear end view of the tube scraper.
Figure 10:
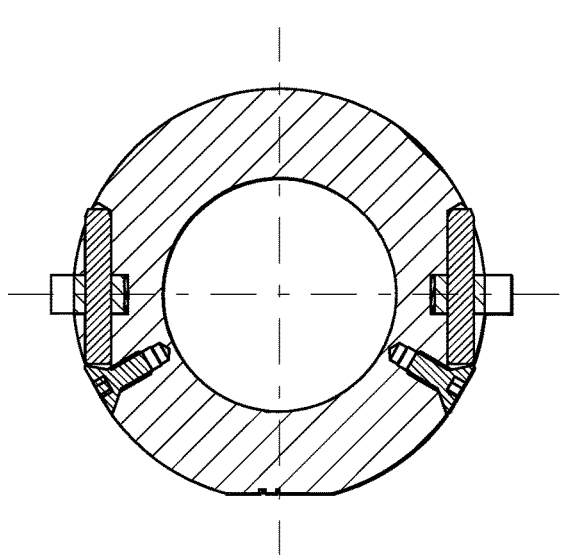
FIG. 10 is a transverse sectional view of the tube scraper taken along line 10-10 of FIG. 5.
Figure 11:
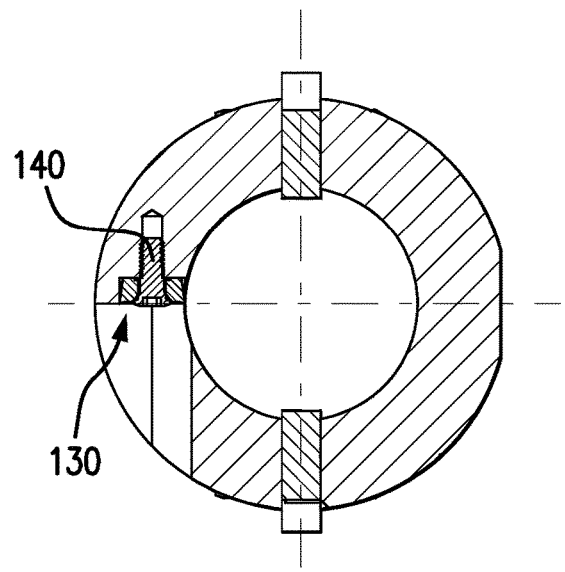
FIG. 11 is a transverse sectional view of the tube scraper taken along line 11-11 of FIG. 7.

The exemplary blade 48 provides a lead-in trimming blade that is positioned to cut material from locations on the tube end portion prior to such locations encountering at least the edge 100 of the blade 44. This may function the partially cut down high spots (e.g., along only a portion of the circumference). FIG. 7 shows a position of a cutting edge 130 of the blade 48 slightly forward of the edge 110. The exemplary blade 48 is an off-the shelf item such as indexable insert part number RCGT 0803MOFN-ALU of ARNO-Werkzeuge USA LLC, |Harvard, Ill., US. Said insert is "indexable" in that it can be rotated about its axis (e.g., by loosening its screw and then retightening) to bring a fresh portion of the cutting edge into operable position protruding into the passageway. This particular exemplary insert has an approximately frustoconical body with a circular cutting edge. Other edge shapes are possible as are other general blade configurations.

The blade 48 may be positioned to knock down diameter to the nominal pipe diameter. This may be particularly relevant to scraping molded fittings rather than extruded pipe. The molding process may involve a draft angle causing proximal portions of the fitting branch to exceed the nominal diameter. The blade 44 may be configured more to scrape a given amount (depth) of material (e.g., 0.005-0.007 inch (0.13-0.18 mm)). This functions more to remove debris and oxidation rather than resize or round.

Figure 12:
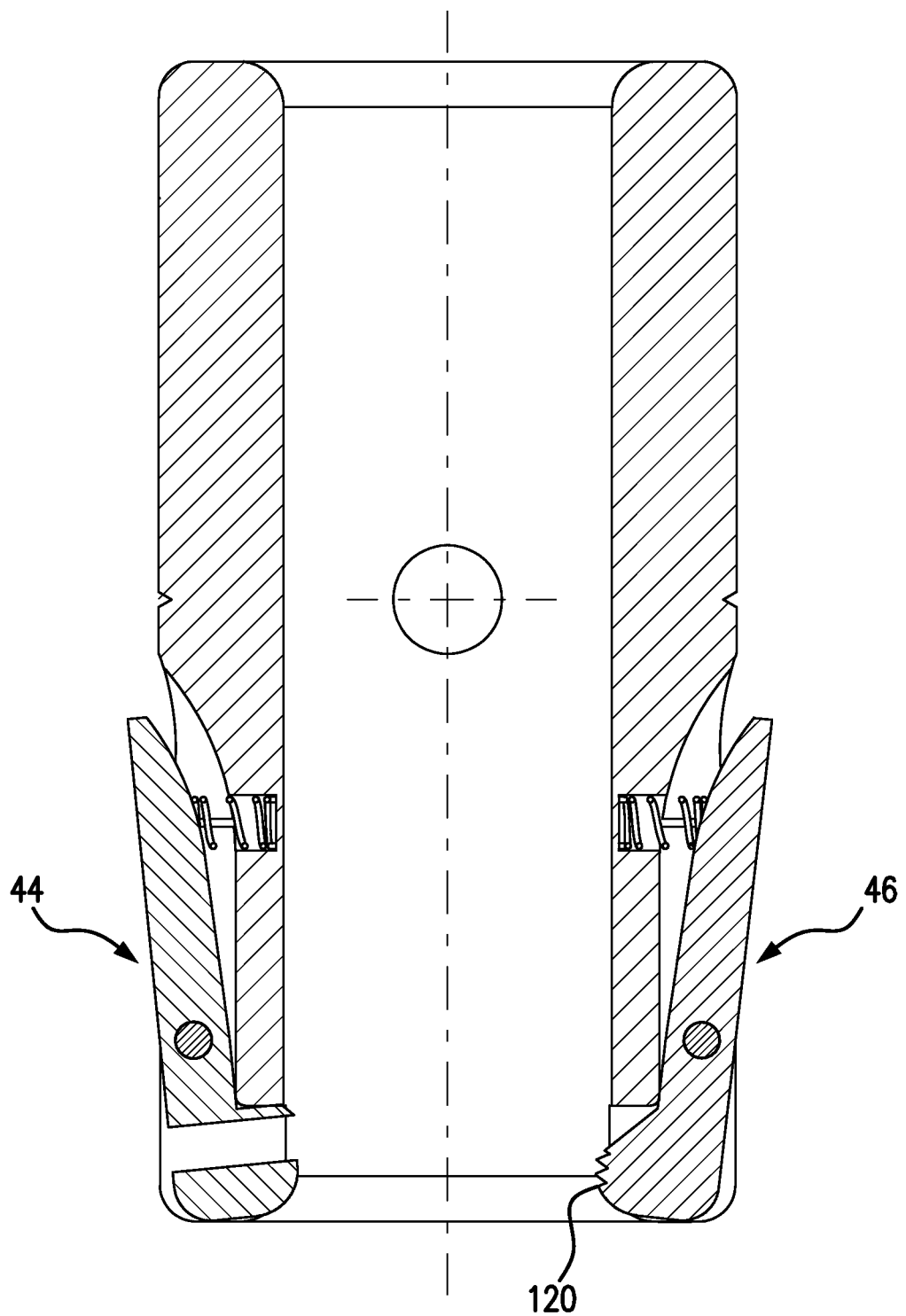
FIG. 12 is a central longitudinal sectional view of the scraper taken along line 12-12 of FIG. 8.

FIG. 12, however, shows how the forwardmost thread segment 120 is slightly ahead of at least a portion of the edge 130 so as to guide initial movement before the tube engages the edge 110.

The exemplary edge 130 is a circular edge of an approximately frustoconical blade 48 having a central aperture receiving a screw 140. A base portion of the blade 48 is accommodated in a tangentially open compartment 150 at a gap 152 in a forward rim portion of the body. Along the passageway, the body longitudinal cross-section has a lead-in round 154. The edge 130 sits slightly proud of that round to cut material from the tubing end.

Figure 15:
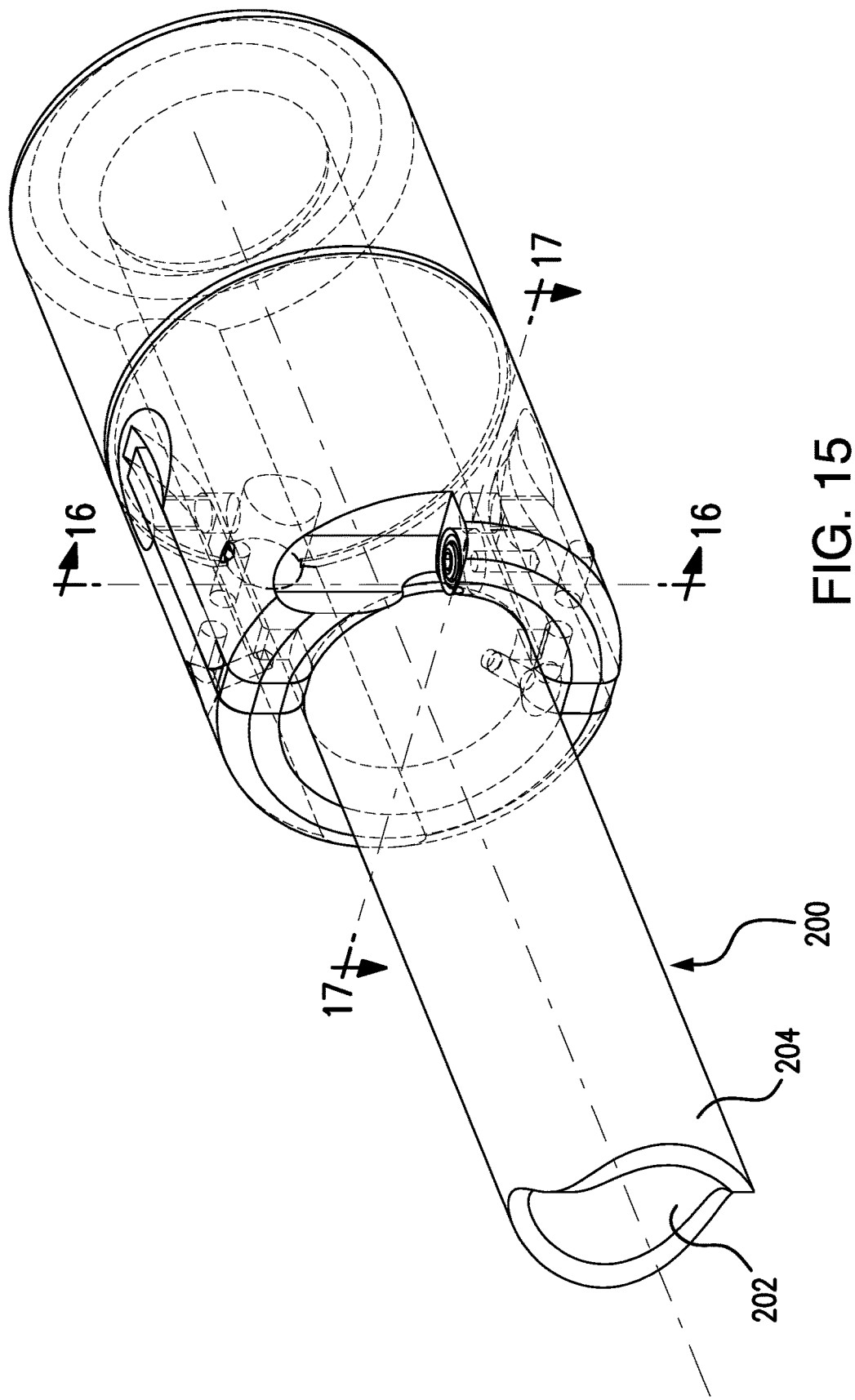
FIG. 15 is an x-ray view of the scraper during an intermediate stage of tube scraping.

FIGS. 15-17 show an intermediate stage of scraping of a pipe 200 having an interior or inner diameter (ID) surface 202 and an exterior or outer diameter (OD) surface 204. The pipe has a first end at a rim 206. The pipe is shown cut away so that an opposite end is not shown. It is accordingly seen that an end portion 210 of the pipe is received in the scraper. The exemplary embodiment shows the end 206 to be shy of the window 42 (FIG. 17) and the indicia 40. Thus, it would be readily apparent to the user that the pipe has not yet reached its fully scraped condition.

Exemplary body material is machined aluminum. Alternative body material may be a molded and/or machined plastic or composite. Exemplary blades 44 and 46 are machined of stainless steel plate stock and heat treated. Exemplary springs are steel (e.g., stainless). Exemplary pins 70 and 72 are machined from steel (e.g., stainless) rod stock. Exemplary screws may be steel (e.g., stainless).

For larger diameter pipe, rather than just increasing blade size, it may be desirable to add blades. One example of added blades involves adding two more opposed spring-biased blades (e.g., 90° offset from blades 44 and 46 if blade 48 is shifted circumferentially by about) 30°-60°. In that example, the added blades could both be like the scraping/cutting blade 44 or one could be like the blade 46 to govern axial movement. In a further variation, the thread segments 120 may be replaced by an alternative angled edge such as a small edged wheel oriented with its edge slightly off-tangential.

One or more embodiments of the present invention have been described. Nevertheless, it will be understood that various modifications may be made without departing from the spirit and scope of the invention. Accordingly, other embodiments are within the scope of the following claims.

What is claimed is:

1. A tube scraping apparatus comprising:
   a body having a passageway for receiving a piping component; and
   a first blade and a second blade, the first blade and second blade each:
      mounted to the body and shiftable between a first condition and a second condition; and
      having an engagement portion positioned to engage an outer diameter (OD) surface of the received piping component in at least one condition, the first blade engagement portion comprising a cutting edge for removing material from the OD surface,
   wherein:
      at least one spring biases the first blade and the second blade from the second condition toward the first condition and into engagement with the OD surface; and
      the second blade engagement portion comprises means for engaging the piping component to convert a rotation of the piping component relative to the body to an axial movement of the piping component relative to the body.

2. The apparatus of claim 1 wherein:
   the first blade is mounted for rotation about a first pivot axis between the associated first and second conditions; and
   the second blade is mounted for rotation about a second pivot axis between the associated first and second conditions.

3. The apparatus of claim 1 wherein:
   the first blade and the second blade each have a lever portion depressable to shift the respective first blade and second blade from the associated first condition to the associated second condition.

4. The apparatus of claim 1 wherein:
   the first blade comprises an edge protruding radially inward from a portion of the first blade axially outboard thereof.

5. The apparatus of claim 1 wherein:
   the means comprises a partial thread.

6. The apparatus of claim 5 wherein:
   the partial thread comprises a plurality of thread segments.

7. The apparatus of claim 1 further comprising:
   a third blade positioned to cut material from a location on the piping component prior to said location encountering a cutting edge of the first blade.

8. The apparatus of claim 7 wherein:
   the third blade is a fixed blade.

9. The apparatus of claim 7 wherein:
   the third blade has a circular cutting edge.

10. A method for using the apparatus of claim 1, the method comprising:
    inserting the piping component into the passageway;
    rotating the piping component in a first direction, the rotating causing the engagement of the second blade engagement portion with the OD surface to convert the rotation into further axial insertion of the piping component relative to the body;
    the rotation causing the first blade cutting edge to remove material from the OD surface;
    shifting the first blade and second blade toward the second condition against spring bias; and
    with the first blade and second blade shifted toward the second condition, extracting the piping component.

11. The method of claim 10 further comprising:
    with a third blade cutting material from a location on the piping component prior to said location encountering the cutting edge of the first blade.

12. A tube scraping apparatus comprising:
    a body having a passageway for receiving a piping component;
    a first blade and a second blade, the first blade and second blade each:
       mounted to the body and shiftable between a first condition and a second condition; and
       having an engagement portion positioned to engage an outer diameter (OD) surface of the received piping component in at least one condition; and a fixed position third blade positioned to cut material from the OD surface of the received the piping component,
wherein:
the first blade engagement portion is a scraper having an edge for engaging the OD surface to remove material as the piping component is rotated against the edge; and
an open channel extends outboard from the edge along one face of the first blade to allow passage of cut material out of the apparatus.

13. A tube scraping apparatus comprising:
a body having a passageway for receiving a piping component; and
a first blade and a second blade, the first blade and second blade each:
mounted to the body and shiftable between a first condition and a second condition; and
having an engagement portion positioned to engage an outer diameter (OD) surface of the received piping component in at least one condition,
further characterized by:
a fixed position third blade positioned to cut material from the OD surface of the received the piping component, the third blade being reorientatably mounted to allow a fresh cutting edge portion to be brought into an operative position.

14. A tube scraping apparatus comprising:
a body having a passageway for receiving a piping component; and
a first blade and a second blade, the first blade and second blade each:
mounted to the body and shiftable between a first condition and a second condition; and
having an engagement portion positioned to engage an outer diameter (OD) surface of the received piping component in at least one condition, the first blade engagement portion comprising a cutting edge for removing material from the OD surface; and
a fixed third blade having a circular edge and positioned to cut material from a location on the piping component prior to said location encountering a cutting edge of the first blade, wherein:
the second blade engagement portion comprises means for engaging the piping component to convert a rotation of the piping component relative to the body to an axial movement of the piping component relative to the body.

15. The apparatus of claim 1 wherein:
the first blade engagement portion is a scraper having an edge for engaging the OD surface to remove material as the piping component is rotated against the edge.

16. The apparatus of claim 15 wherein:
an open channel extends outboard from the edge along one face of the first blade to allow passage of cut material out of the apparatus.

* * * * *